UNITED STATES PATENT OFFICE.

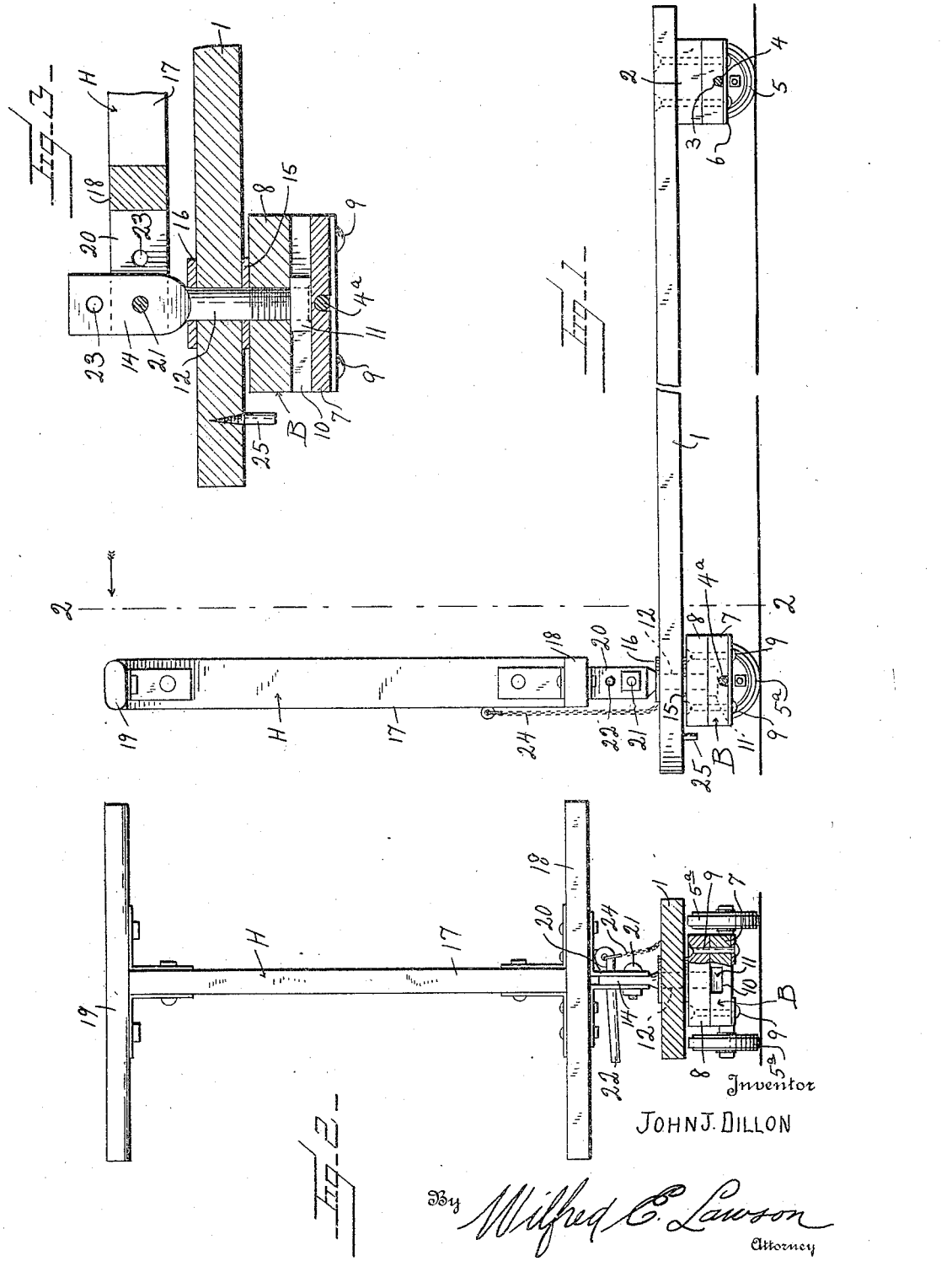

JOHN J. DILLON, OF SAN FRANCISCO, CALIFORNIA.

VEHICLE.

1,293,365.  Specification of Letters Patent.  Patented Feb. 4, 1919.

Application filed July 30, 1917. Serial No. 183,468.

*To all whom it may concern:*

Be it known that I, JOHN J. DILLON, a citizen of the United States of America, residing at San Francisco, in the county of San Francisco and State of California, have invented certain new and useful Improvements in Vehicles, of which the following is a specification.

This invention relates to certain improvements in vehicles and has relation more particularly to a device of this general character especially designed and adapted for use by children, and it is an object of the invention to provide a wheel supported vehicle having novel and improved means whereby the same may be readily and conveniently employed when the operator or child is in a standing position thereupon and whereby the same can be readily controlled when coasting or drifting.

It is also an object of the invention to provide a vehicle of this general character including novel and improved steering means comprising a handle member which may be locked in vertical position or adjusted into a lowered position to facilitate its use when the operator or child is in a seated position thereon.

The invention consists in the details of construction and in the combination and arrangement of the several parts of my improved vehicle whereby certain important advantages are attained and the device is rendered simpler, less expensive, and otherwise more convenient and advantageous for use, all as will be hereinafter more fully set forth.

The novel features of the invention will hereinafter be definitely claimed.

In order that my invention may be the better understood I will now proceed to describe the same with reference to the accompanying drawings, wherein—

Figure 1 is a view in side elevation of a vehicle constructed in accordance with an embodiment of my invention;

Fig. 2 is a sectional view taken substantially on the line 2—2 of Fig. 1; and

Fig. 3 is an enlarged fragmentary view, partly in elevation and partly in section, illustrating certain details of the invention as herein included.

As disclosed in the accompanying drawings 1, denotes the body of my improved vehicle of any desired configuration and dimensions and preferably elongated and relatively narrow. Suitably secured to the rear end portion of the body 1, is the bolster 2, provided in its under face with the channel 3, extending transversely of the body 1, and in which is seated the axle 4. Secured to each end portion of the axle 4, is a supporting wheel 5. The axle 4 is held with the channel 3, by a plate 6, arranged adjacent each side of the bolster 2.

Underlying the forward end portion of the body 1, is a bolster B, comprising two superimposed sections 7 and 8, held in assembled relation in any desired manner but preferably by the rivets 9, or the like. The inner face of the lower section 7, is provided with a groove 10, in which is seated a nut 11, having in threaded engagement therewith the lower end portion of the shank 12 which is also threaded through the upper section 8 at substantially the center thereof. The shank 12, is also loosely directed through the forward end portion of the body at the transverse center thereof. The portion 14, of the shank 12, above the body 1 is flattened. Interposed between the section 8 and the under face of the body 1, is a washer 15, surrounding the shank 12; and also mounted upon the shank 12, intermediate the upper face of the body 1, and the flattened portion 14, of the shank 12, is a second washer 16. The washers 15 and 16 serve as wear plates.

Coacting with the under face of the section 7, of the bolster B, is the axle 4ᵃ, held thereto in the same manner as has hereinbefore been set forth relative to the axle 4. Mounted upon the axle 4ᵃ are the wheels 5ᵃ.

H denotes a handle member comprising the elongated central bar 17, having secured to its opposite end portions the cross strips 18, and 19. Depending from the lower strip 18, are the spaced arms or brackets 20 between which extends the flattened portion 14. The arms or brackets 20 and the flattened portion 14, are pivotally connected by the bolt 21. The member H is maintained in a vertical position by the pin 22, insertible through the openings 23 in the flattened portion 14 and the arms or brackets 20 above the pivot bolt 21. The pin 22 is held against loss by the flexible member or chain 24, anchored to the central bar 17.

The direction of travel of the vehicle is readily controlled by imparting requisite rotary movement to the shank 12. When the child is standing upon the body 1, the upper cross strip 19, is grasped by the hands for the purpose of steering and the member H is locked in its vertical position. When the child is seated upon the body 1, the pin 22 is removed and the member H, swung downwardly. If desired the feet may be placed upon the lower cross strip 18 to assist in steering or to afford a support for the feet when the vehicle is coasting or drifting.

Depending from the body 1, at its transverse center and in advance of the bolster B, is a pin 25 or the like which serves to limit the swinging movement of the bolster B in either direction.

From the foregoing description, it is thought to be obvious that a vehicle constructed in accordance with an embodiment of my invention is of an extremely simple and comparatively inexpensive nature and is particularly well adapted for use by reason of the convenience and facility with which the various parts may be assembled, and it will also be obvious that my invention is susceptible of some change and modification without material departure from the principle and scope thereof and for this reason I do not wish to be understood as limiting myself to the precise arrangement and formation of the several parts in carrying out my invention in practice, except as hereinafter claimed.

I claim:

A vehicle comprising a body, supporting means coacting with one end portion of the body, a bolster underlying the opposite end portion thereof, said bolster comprising two superimposed sections, the inner face of one of the sections being provided with a channel, a nut seated within said channel, a shank threaded through one of the sections and in threaded engagement with the nut, said shank being loosely directed through the body, a handle member operatively engaged with the shank, and supporting means carried by the bolster.

In testimony whereof I affix my signature in the presence of two witnesses.

JOHN J. DILLON.

Witnesses:
THOMAS J. FORD,
JAMES A. TOOHIG.

Copies of this patent may be obtained for five cents each, by addressing the "Commissioner of Patents, Washington, D. C."